United States Patent [19]
Brickner

[11] 4,335,339
[45] Jun. 15, 1982

[54] ELECTRONIC SAFETY DEVICE
[76] Inventor: Joseph L. Brickner, 2215 S. Grand Ave., Santa Ana, Calif. 92705
[21] Appl. No.: 95,936
[22] Filed: Nov. 20, 1979
[51] Int. Cl.³ ............... E05F 15/10; H02H 7/09; H02P 3/00
[52] U.S. Cl. .................... 318/282; 318/266; 318/469; 318/626; 318/798; 361/31; 49/28
[58] Field of Search ............ 318/469, 266, 267, 626, 318/798, 806, 474, 696, 282; 361/31, 23; 49/28, 31; 324/111

[56] References Cited
U.S. PATENT DOCUMENTS

| 3,254,289 | 5/1966 | Hartman | 318/469 |
|---|---|---|---|
| 3,609,461 | 9/1971 | Obenhaus | 361/31 |
| 3,678,622 | 7/1972 | Miller | 49/28 |
| 3,685,013 | 8/1972 | Brickner . | |
| 3,891,909 | 6/1975 | Newson | 318/469 |
| 3,993,975 | 11/1976 | Long, Jr. et al. | 49/28 |
| 4,074,179 | 2/1978 | Kuo et al. | 318/696 |
| 4,217,616 | 8/1980 | Jessup | 361/31 |
| 4,247,806 | 1/1981 | Mercier | 318/469 |

Primary Examiner—J. V. Truhe
Assistant Examiner—Richard M. Moose
Attorney, Agent, or Firm—Rankin A. Milliken

[57] ABSTRACT

An electronic safety device circuit is disclosed. This circuit includes two integrated circuit operational amplifiers, the first connected as an operational amplifier and the second connected as a follower. The output pin of the first amplifier is connected to the positive input pin of the second amplifier through a diode. The positive input pin of the second amplifier is connected to a memory capacitor. The output pin of the second amplifier is connected to the negative input pin of the first amplifier. A switching network is provided for grounding the positive input pin of the first amplifier and discharging the memory capacitor.

15 Claims, 3 Drawing Figures

ELECTRONIC SAFETY DEVICE

BACKGROUND OF THE INVENTION

1. Field of the Invention

The present invention relates to electronic safety devices, and more particularly to devices for initiating protective action in response to current variations indicative of the existence of unsafe conditions, such as the inadvertent driving of a power-operated gate against a vehicle or a human being.

2. Prior Art Statement (The following prior art is disclosed pursuant to 37 CFR 1.56, 1.97, and 1.98.)

U.S. Pat. No. 3,959,704, issued May 25, 1976, teaches the concept of providing time delay means for determining when a run overload protective circuit is to be activated after startup of a motor. A motor current sensing transformer is used to provide the motor condition signal for the patented device. FIG. 1 shows delay means 112 which inhibits operation of the patented circuit during the starting surge of the motor current, as taught at column 6, line 25 et seq.

U.S. Pat. No. 3,435,289, issued Mar. 25, 1969, discloses an automatic disconnect device for an electrical motor responsive to the sensing of a variation in motor current level. Other United States patents which were adduced by a preliminary patentability search of the present invention, and thus might be held to have some relation to the present invention, are U.S. Pat. Nos. 4,057,842; 4,000,446; 3,953,777; 3,602,771; 4,041,540; and 4,060,844.

It is to be particularly noted that while some of the abovecited prior patents relate to the protection of electric motors from the consequences of overload, the devices disclosed therein are not necessarily sufficiently sensitive or rapid-acting for use in the protection of vehicles or human beings from impingent, motordriven gates and the like.

SUMMARY OF THE INVENTION

It is accordingly an object of the present invention to provide improved electronic safety devices for initiating protective action in response to current variations indicative of the existence of unsafe conditions. It is a further object of the present invention to provide electronic safety devices responsive to motor currents, which electronic safety devices are sufficiently sensitive and quick-acting so as to be useful in protecting vehicles and persons from injury by gates and the like driven by their associated electric motors.

It is yet another object of the present invention to provide current-operated electronic safety devices which are less expensive and less complex than the current-operated electronic safety devices of the prior art.

Other objects of the present invention will in part be obvious and will in part appear hereinafter.

The present invention, accordingly, comprises the features of construction, combinations of elements, and arrangements of parts, which will be exemplified in the constructions hereinafter set forth, and the scope of the present invention will be indicated in the appended claims.

In accordance with a principal feature of the present invention, a motor current responsive electronic safety device comprises a feedback network including an integrated circuit amplifier connected as an operational amplifier and an integrated circuit amplifier connected as a follower.

In accordance with another principal feature of the present invention, said operational amplifier is provided with a signal representing the steady state current of an electric motor or the like, and the output signal of said operational amplifier is fed through a diode to an RC network which supplies the input signal to said follower.

In accordance with yet another principal feature of the present invention, one of the input terminals of said operational amplifier is provided with an input signal representative of the output signal of said follower.

For a fuller understanding of the nature and objects of the present invention, reference should be had to the following detailed description, taken in connection with the accompanying drawings.

BRIEF DESCRIPTION OF THE DRAWINGS

FIG. 2 is a diagram representing the operation of the system of FIG. 1, including the blocking of the cantilever barrier gate of FIG. 1 by a vehicle, or the like.

DESCRIPTION OF THE PREFERRED EMBODIMENTS

Figure 1:
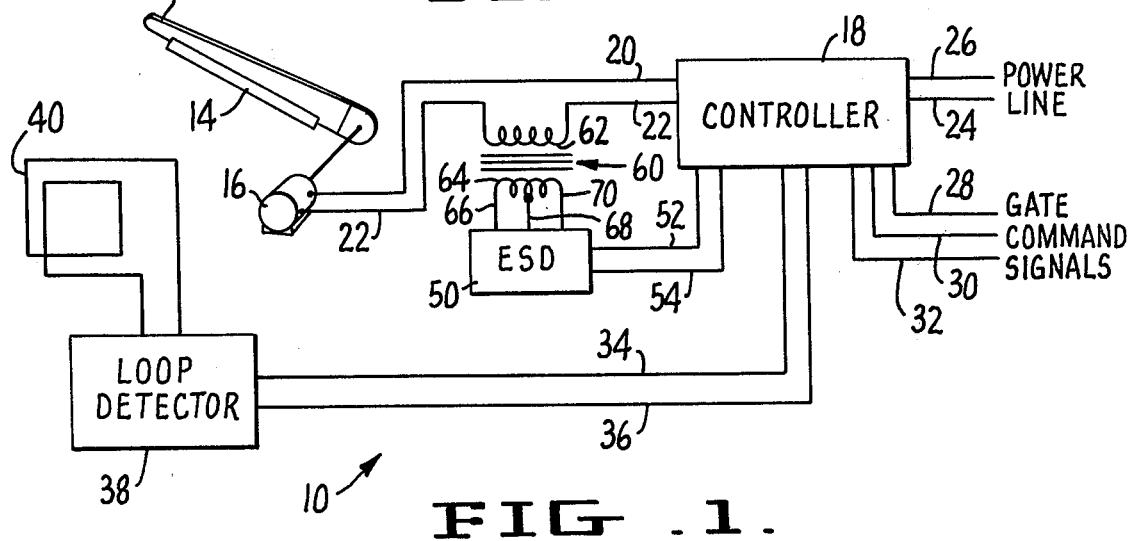
FIG. 1 is a schematic representation of a gate control circuit including the electronic safety device of the present invention.

Referring now to FIG. 1, there is shown a gate control system 10 embodying the present invention.

Gate control system 10 comprises a conventional cantilever barrier gate 12 of the kind used in connection with vehicle parking lots. Gate 12 is provided, in the known manner, with a resilient boot 14, to provide against marring vehicles with which gate 12 inadvertently comes in contact. In the well-known manner, gate 12 is driven between its open and closed positions by means of an electric motor 16 and suitable gearing (not shown). Gate drive motor 16 is provided with energizing current by a controller 18 of conventional type, by way of electrical supply lines 20, 22.

Controller 18 is supplied with electrical power by supply lines 24, 26 connected to an existing power line in the well-known manner. As is well-known to those having ordinary skill in the art, a gate controller such as controller 18 operates in the well-known manner to energize or de-energize an associated motor (16) in response to the connection or non-connection of pairs of its input terminals by means of switches or relays embodied in other devices of the gate control system. Thus, controller 18 may receive gate command signals on lines 28, 30, 32, which gate command signals consist in the interconnection of pairs of these lines by manually operated switches, or by relays contained in apparatus responsive to vehicle-driver-presented magnetic cards, or responsive to the withdrawal of a parking ticket from a suitable receptacle. Another form of controller actuating signal may be received by controller 18 over connecting electrical lines 34 and 36. As seen in FIG. 1, a loop detector 38 of well-known type is connected to electrical lines 34 and 36. In the well-known manner the vehicle detecting loop 40 associated with loop detector 38 is located immediately below gate 12 when gate 12 is in its closed position. This arrangement is sometimes called a "safety loop". In the well-known manner, loop detector 38 is arranged to close the contacts of an output relay whenever a vehicle stands over safety loop 40. Electrical lines 34 and 36 are so connected to the terminals of said relay that they are directly interconnected through the relay whenever a vehicle stands over safety loop 40. Thus, controller 18 is supplied, in the well-known manner, with a command signal consisting of the interconnection of its signal input lines 34 and 36 whenever a vehicle stands over loop 40. As is well-known to those having ordinary skill in the art, controller 18 can be designed or field-programmed to never operate gate 12 in its downward direction, toward its closed position, when lines 34 and 36 are directly interconnected through the output relay of loop detector 38, i.e., when a vehicle is located over safety loop 40.

In accordance with the teachings of the present invention, controller 18 is also provided with actuating signals by an electronic safety device 50 embodying the present invention, via electrical leads 52 and 54. As also seen in FIG. 1, a current transformer 60 is provided for supplying electronic safety device 50 with signals representative of the magnitude of the motor current flowing in motor power supply line 22. Thus, as seen in FIG. 1, the primary winding 62 of current transformer 60 is inserted into motor current supply line 22. As also seen in FIG. 1, the secondary winding 64 of current transformer 60 is center tapped, and thus the motor current signals are provided to electronic safety device 50 on three leads 66, 68, and 70. The three motor current signal input leads 66, 68, 70 are designated in FIG. 3 by the same reference numerals.

Many possible modifications of the gate control system of FIG. 1 will be evident or well-known to those having ordinary skill in the art. For example, controller 18 may be responsive to the opening of interconnections between its input terminals, rather than the closing of interconnections therebetween, and thus associated apparatus such as the gate command signal source, loop detector 38, and the electronic safety device of the present invention may be provided with three output terminals, one pair normally open and one pair normally closed. Similarly, current transformer 60 may be incorporated with the electronic safety device of the present invention, or may be supplied and mounted separately.

Figure 2:
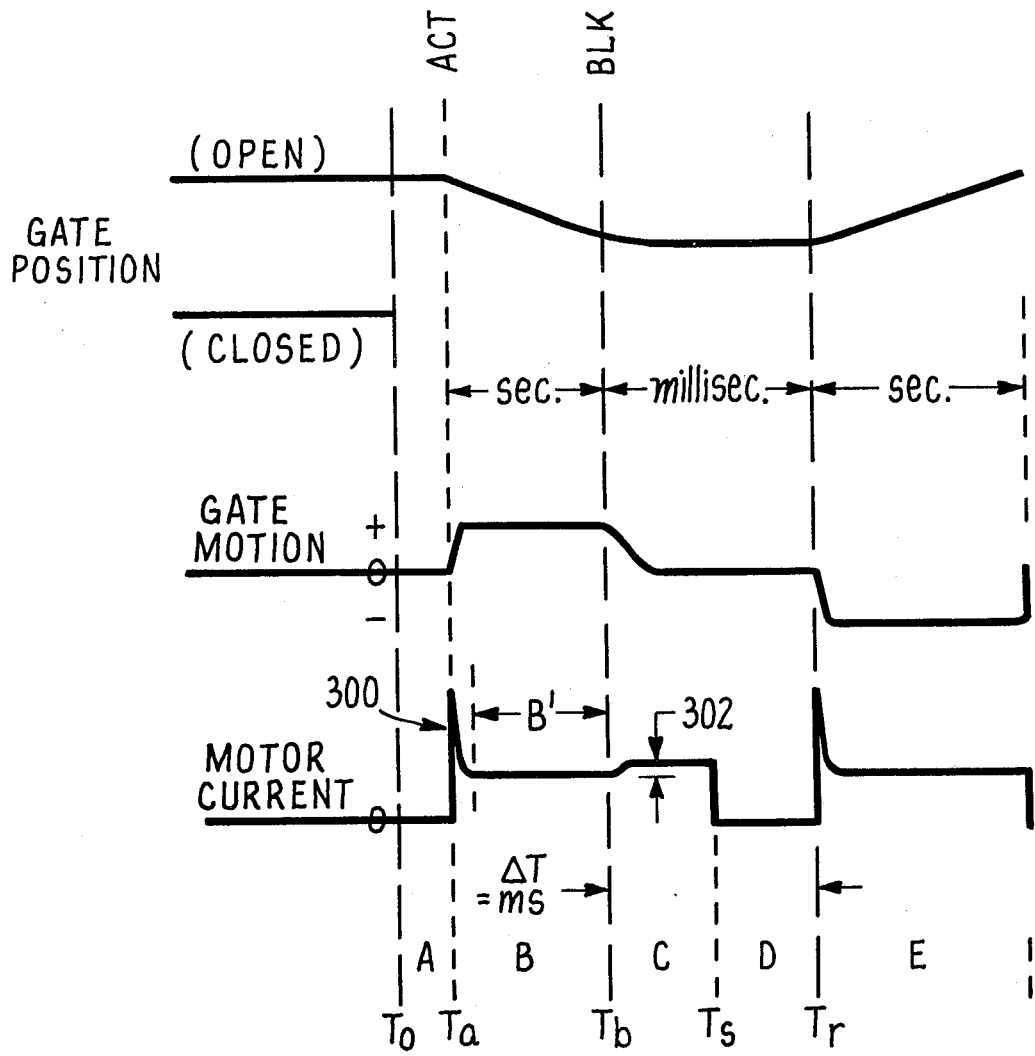

Referring now to FIG. 2, there is shown a time diagram of the operation of the gate control system of FIG. 1 during a period of operation when gate 12 is initially driven from its full open position toward its closed position, contacts a vehicle standing below it which inadvertently was not detected by safety loop 40, and thus is operated back to its full open position by motor 16 under the control of controller 18 and electronic safety device 50.

The time diagram of FIG. 2 will be referred to hereinafter in explaining the operation of the circuit of FIG. 3, which embodies the present invention. It should be noted presently, however, that the time period C extending from the blocking of gate 12 by the vehicle until the cutoff of the current supply to motor 16 is but a matter of milliseconds, and that thus the vehicle below gate 12 is very unlikely to be damaged by gate 12, especially given the presence of protective resilient boot 14.

It should also be presently noted that the time period D extending from the cutoff of motor current to the commencement of the reverse driving of gate 12 is but a matter of milliseconds.

Thus, it will be seen that the electronic safety device of the present invention is particularly suited to the prevention of injury of persons and things by motor-driven elements. It is to be understood, however, that the present invention is not limited to such protective applications.

Figure 3:
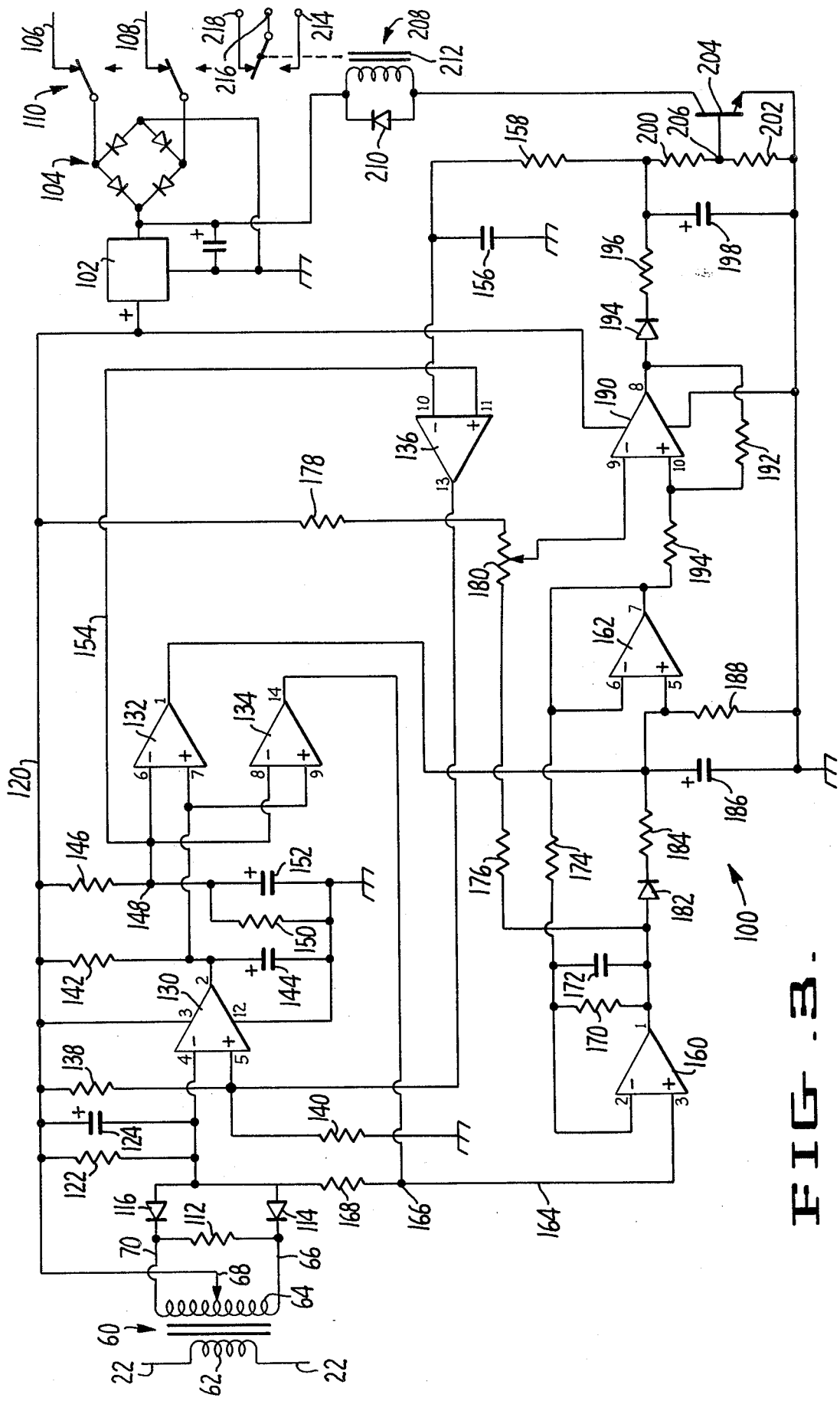
FIG. 3 is a schematic representation of a circuit embodying the present invention.

Referring now to FIG. 3, there is shown an electronic safety device circuit embodying the present invention.

The circuit 100 of FIG. 3 is powered by means of a regulated 18-volt direct current supply 102, which is itself provided with power by a diode bridge network 104, connected across a single phase source of power 106, 108 via a manually operable power switch 110.

As further seen in FIG. 3, a 1,000 ohm resistor 112 is connected between the outer terminals 66, 70 of the secondary winding 64 of power transformer 60. The respective cathodes of diodes 114, 116 are connected to the oppposite ends of resistor 112, and the anodes of diodes 114, 116 are interconnected by a common bus 118.

A supply bus 120 is connected from the positive output terminal of 18 volt direct current supply 102 to the center tap 68 of secondary winding 64 of current transformer 60.

As also seen to FIG. 3, a resistor 122 (100,000 ohms) is connected between supply bus 120 and the bus interconnecting the anodes of diodes 114, 116.

Thus, as will be evident to those having ordinary skill in the art, informed by the present disclosure, current flow in motor supply line 22, and thus in the primary winding 62 of current transformer 60, will result in a voltage signal across resistor 122 representative of the magnitude of the motor current flowing through motor supply line 22 and transformer primary 62.

A one microfarad capacitor 124 is connected directly across resistor 122, for reasons which will become apparent hereinafter.

Circuit 100 also comprises four integrated circuit amplifiers 130, 132, 134, 136 each of which is connected as a comparator in the well-known manner, so that its output terminal can be considered at all times to be either "open", i.e., internally unconnected to any other terminal, or "grounded", i.e., connected to the common ground of the circuit.

Each of the integrated circuit amplifiers 130, 132, 134, 136 may, for example, be a model 339 amplifier, of well-known type, constituting one section of a model 339 integrated circuit chip. For this reason, the various terminals of these integrated circuit amplifiers will be designated by the corresponding pin numbers of a standard model 339 integrated circuit chip package, and will be called herein "pins", rather than "terminals".

Considering first integrated circuit amplifier 130, it will be seen that pin 4 thereof (the negative input terminal) is directly connected to bus 118.

The positive input terminal (pin 5) of integrated circuit amplifier 130 is directly connected to the center point of a voltage divider network consisting of 43,000 ohm resistor 138 and 220,000 ohm resistor 140.

Thus, since this voltage divider network is connected between bus 120 and circuit ground, it will be seen that pin 5 of integrated circuit amplifier 130 is maintained at approximately 15 volts direct current positive, except when it is connected to ground through pin 13 of integrated circuit amplifier 136, as hereinafter described.

In the known manner, pin 3 of integrated circuit amplifier 130 is connected directly to supply bus 120, and pin 12 thereof is connected to circuit ground. (It is to be understood that certain conventional integrated circuit amplifier pin interconnections may be omitted from the present drawing for purposes of clarity.)

As also seen in FIG. 3, a 470,000 ohm resistor 142 is connected between output pin 2 of integrated circuit amplifier 130 and supply bus 120. Further, a one microfarad capacitor 144 is connected between pins 2 and 12 of amplifier 130, and pin 112 is connected to ground.

Considering now amplifiers 132 and 134, it will be seen in FIG. 3 that pins 7 and 9 thereof (the respective positive input terminals) are both connected to pin 2 of amplifier 130. The negative input terminals (pins 6 and 8) of integrated circuit amplifiers 132 and 134 are both connected to one terminal of a 6.8 kilohm resistor 146, the opposite terminal of which is connected to supply bus 120. The common junction 148 of resistor 146 and amplifier pins 6 and 8 is itself connected to one terminal of an RC network consisting of 6.8 kilohm resistor 150 and one microfarad condenser 152. The opposite terminal of this RC network is connected to circuit ground. Thus, it will be seen that junction 148 is normally maintained at approximately 9 volts DC above ground.

As also seen in FIG. 3, the positive input terminal (pin 11) of integrated circuit amplifier 136 is directly connected by conductor 154 to junction 148.

As will now be evident to those having ordinary skill in the art, informed by the present disclosure, each one of the comparator-connected integrated circuit amplifiers 130, 132, 134, 136 acts as a shorting switch to circuit ground. That is to say, whenever the negative input terminals of any one of these comparator-connected amplifiers is at higher positive potential above circuit ground than its positive input terminal, its output terminal will effectively be directly connected to circuit ground. Similarly, whenever the positive input terminal of any one of these comparator-connected integrated circuit amplifiers is at higher positive potential with respect to ground than its negative input terminal, its output terminal will be effectively isolated (open circuit) from all of its other terminals.

Thus, when pin 10 of comparator-connected amplifier 136 is at higher positive potential with respect to circuit ground than pin 11 thereof, pin 13 thereof will be grounded, and thus pin 5 of comparator-connected amplifier 130 will be grounded.

Referring again to FIG. 3, it will be seen that the input signal is applied to pin 10 of amplifier 136 through an RC network consisting of 0.02 microfarad capacitor 156 and one megohm resistor 158.

Referring now to the lower portion of FIG. 3, it will be seen that two integrated amplifiers 160, 162 are interconnected in a feedback loop arrangement in which the positive input signal to integrated circuit amplifier 162 is conditioned by the output signal of integrated circuit amplifier 160, and the negative input signal (pin 2) of integrated circuit amplifier 160 is conditioned by the output signal of integrated circuit amplifier 162.

The input signal to this feedback loop is supplied to pin 3 (the positive input terminal) of integrated circuit amplifier 160 by direct connection 164 to junction 166. As will also be seen from FIG. 3, pin 14 of comparator-connected amplifier 134 is directly connected to junction 166. Thus, it can be said that amplifier 134 grounds out the input signal to said feedback loop whenever its negative input terminal (pin 8) is more positive with respect to ground than its positive input terminal (pin 9).

As also seen in FIG. 3, junction 166 is connected to bus 118 through a 2.2 megohm resistor 168.

Returning to the lower portion of FIG. 3, it will be seen that an RC network consisting of a 220 kilohm resistor 170 and a 0.22 microfarad capacitor 172 are connected between pin 1 and pin 2 of amplifier 160. It will further be noted that a 68 kilohm resistor 174 is included in the feedback connection between amplifier 162 and amplifier 160.

As will now be evident to those having ordinary skill in the art, informed by the present disclosure, amplifier 160 operates as an operational amplifier, the output voltage at pin 1 of which is determined by the difference in potential between its input terminals (pins 2 and 3). Thus, it will be understood that output pin 1 of amplifier 160 will be at its lowest potential, near zero, when the potentials on pins 2 and 3 are the same, and will rise from that level as the input potentials on pins 2 and 3 depart from each other.

As also seen in FIG. 3, pin 1 of operational amplifier 160 is connected to supply bus 120 by means of a series network consisting of a 3.3 kilohm resistor 176, a ten kilohm resistor 178, and a twenty-five kilohm potentiometer 180.

As also there seen, output pin 1 of operational amplifier 160 is connected to input pin 5 of amplifier 162 through a series network consisting of a diode 182 and a 47 ohm resistor 184.

A memory capacitor 186, which "remembers" a voltage proportional to the steady state motor current, and is a one microfarad capacitor, is connected between input pin 5 of amplifier 162 and circuit ground. A 22 megohm resistor 188 is connected across memory capacitor 186.

As will be evident to those having ordinary skill in the art, informed by the present disclosure, integrated circuit amplifier 162 is connected as a follower amplifier, i.e., its output voltage on pin 7 approximately follows the changes in its input voltage on pin 5, its input impedance is high, e.g., on the order of 10 million megohms, and its output impedance is low, e.g., on the order of several ohms.

Going now to consideration of integrated circuit amplifier 190, which like integrated circuit amplifiers 160 and 162 is a section of a model 324 integrated circuit amplifier chip, it will be understood by those having ordinary skill in the art, informed by the present disclosure, that integrated circuit amplifier 190 is connected as a comparator. In the circuit of the preferred embodiment the voltage at pin 8 of amplifier 190 is low when the positive voltage with respect to ground on pin 9 exceeds the positive voltage with respect to ground on pin 10, and the voltage at output pin 8 is high when the positive voltage with respect to ground on input pin 10 exceeds the positive voltage with respect to ground on input pin 9.

In the embodiment of FIG. 3, the feedback resistor between pins 8 and 10 of amplifier 190 is a 220,000 ohm resistor, and the series resistor between pin 7 of amplifier 162 and pin 10 of amplifier 190 is a 10,000 ohm resistor.

Output pin 8 of amplifier 190 is connected via a diode 194 and a 92 ohm resistor 196 to the above-ground terminal of a parallel RC network consisting of a 47 microfarad capacitor 198, a 20 kilohm resistor 200, and a 3.3 kilohm resistor 202.

The base of a 2N3904 transistor 204 is connected to the common junction 206 of resistors 200 and 202, and, as seen in FIG. 3, the energizing current of output relay 208 is controlled by transistor 204. Diode 210 is connected across the coil 212 of relay 208 for the well-known purpose of such diodes, and may be selected by one having ordinary skill in the art without the exercise of invention.

As may also be seen in FIG. 3, relay 208 selectively interconnects output terminal 216 of circuit 100 with either output terminal 214 or output terminal 218.

Thus, it will be understood by those having ordinary skill in the art, informed by the present disclosure, who compare FIGS. 1 and 3 hereof that leads 52 and 54 of FIG. 1 will either be connected to terminal 214 and 216 respectively, or terminal 216 and 218, respectively, of circuits 100, which is contained within the rectangle labeled ESD in FIG. 1, depending upon the nature of controller 18.

OPERATION

The operation of circuit 100 may best be understood by first considering the time $T_o$ at which time gate 12 is standing in its full open position, and is unmoving.

(For convenience, each amplifier pin will hereinafter be referred to by the reference number of the amplifier, followed by a hyphen, followed by the pin number. Thus, the output terminal of amplifier 130 will hereafter be designated as 130-2.)

At time $T_o$ the voltage of pin 130-4 (bus 118) will be approximately 18 volts DC positive with respect to ground. At the same time, the following pins will effectively be grounded: 130-2, 160-2, 160-3, and 136-10. At the same time, pin 136-13 will be open-circuited, i.e., will be effectively isolated from all of the other terminals of amplifier 136. Also, pin 130-5 will be at approximately 15 volts positive with respect to circuit ground.

From the above, it will be understood by those having ordinary skill in the art that the abovesaid feedback loop comprising amplifiers 160 and 162 will be inactivated, and prepared for its next operation.

It will now be assumed that a time $T_a$ of FIG. 2 controller 18 (FIG. 1) actuates motor 16 to commence driving gate 12 toward its fully closed position, inappropriately because, as noted above, a vehicle remains over safety loop 40 and under gate 12.

At this time ($T_a$), when the motor current to motor 16 has just been switched on by controller 18, a surge of current flows through primary winding 62 of current transformer 60, and thus a large rectified voltage drop appears across resistor 122. The large voltage drop across resistor 122 drives pin 130-4 negative with respect to pin 130-5, and thus, for the reasons given above, pin 130-2 immediately becomes open-circuited, i.e., isolated from all of the other terminals of amplifier 130.

Thus, capacitor 144 is permitted to charge through resistor 142, and the voltages on pins 132-7 and 134-9 rise above the approximate 9 volt potential on pins 132-6 and 134-8, whereupon pins 132-1 and 134-14 become open-circuited, and thus the abovesaid feedback loop is released from its inactivated state.

However, as will be evident to those having ordinary skill in the art, informed by the present disclosure, the feedback loop is not released from its inactivated state until a time determined by the time constant of capacitor 144 and resistor 142, by which time the motor starting current surge 300 (FIG. 2) has dissipated, and the motor current has reached its steady state. (The period when the motor current is at its steady state value, and before gate 12 is blocked by said vehicle, is indicated as B' in FIG. 2.)

When the feedback loop including amplifiers 160 and 162 is thus released from its inactivated state, a rectified direct current voltage proportional to the steady state motor current value is applied to pin 160-3 via lead 164 and resistor 168. The value of the voltage on pin 160-3 will generally lie between 3 volts DC and 12 volts DC, depending upon the steady state value of the motor current in primary winding 62, with higher pin 160-3 voltages corresponding to lower steady state motor currents, and vice versa.

The voltage on pin 162-5 rises to approximately the same value as the voltage on pin 160-3, less the standoff voltage of diode 182, which is approximately 0.5 volts.

Memory capacitor 186 quickly charges to the voltage of pin 162-5. Since amplifier 162 is connected as a follower, the voltage on pin 162-7 rises to the same value as the voltage on pin 162-5, and, as may be seen in FIG. 3, this voltage is applied to pin 190-10.

The voltage on pin 190-9, however, is determined by the setting of sensitivity potentiometer 180, and is in general set to a value which is a volt or so higher than the voltage which appears at pin 190-10 during the period B' shown in FIG. 2.

It follows, in accordance with the circuit interconnection of amplifier 190 as described hereinabove, that pin 190-8 remains at its low voltage level during time period B', and thus output relay 208 is not actuated during time period B'.

Going now to $T_b$ (FIG. 2), it will be seen that the descent of gate 12 is blocked by contact with said vehicle, and thus there is an abrupt increase in the motor current in lines 20 and 22. This increase in motor current is represented by the rise 302 in the motor current line of FIG. 2. It is to be understood, however, that current rise 302 is greatly exaggerated in FIG. 2 for clarity of illustration, and that in general the rise of current occasioned by the blocking of gate 12 can be accurately detected, against the background of noise and other power line signals, only by a sensitive circuit such as that of the present invention.

Due to this abrupt increase in motor current, the voltage at pin 160-3 drops.

Due to the operation of the feedback loop of the present invention, however, the voltage of pin 160-2 was, just prior to the blocking of gate 12, close to the voltage on pin 160-3.

It follows that immediately after the immediately aforedescribed drop of the voltage on pin 160-3 the voltage on pin 160-1 drops below the voltage on pin 162-5.

Thus, diode 182 is immediately reverse-biased, and effectively becomes an open circuit, thus maintaining the steady state motor current equivalent signal voltage on memory capacitor 186 until it drains through resistor 188.

It follows that the voltage on pin 190-10 momentarily remains substantially the same as it was before the blocking of gate 12.

However, the voltage drop at pin 160-1 is reflected at pin 190-9 via resistor 176 and potentiometer 180.

Due to this change of the voltage on pin 190-9, amplifier 190 "switches", and the voltage on pin 190-8 rises to approximately 18 volts DC positive. Thus, capacitor 198 is charged, and transistor 204 conducts, energizing relay 208, and changing the condition of leads 52 and 54 (FIG. 1), i.e., from connected to disconnected, or vice versa.

Thus, at time $T_s$ (FIG. 2), controller 18 is actuated by circuit 100 (ESD 50 of FIG. 1) to interrupt the current to motor 16.

(It is assumed that controller 18 is so constructed and arranged, within the scope of ordinary skill in the art, that when relay 208 is de-energized the motor current will be reversed, and motor 16 will drive gate 12 upward to its fully open position.

After the actuation of relay 208 at time $T_s$ as shown in FIG. 2, the switching portion of circuit 100, comprising comparator-connected amplifiers 130, 132, 134, and 136, operates to inactivate the feedback loop portion, comprising integrated circuit amplifiers 160 and 162, in the following manner.

The application of the voltage across capacitor 198 to pin 136-10 is slightly delayed by the RC network consisting of capacitor 156 and resistor 158, the time constant of this network being a few milliseconds.

After the expiration of this delay interval, when pin 136-10 is driven to a greater positive voltage with respect to circuit ground than pin 136-11, pin 136-13 becomes grounded, i.e., connected to circuit ground through integrated circuit amplifier 136, and thus pin 130-5 becomes grounded.

Since grounded pin 130-5 is at a lower positive voltage with respect to ground than pin 130-4, and because integrated circuit amplifier 130 is connected as a comparator, pin 130-2 is immediately grounded, and pins 132-7 and 134-9 are immediately grounded.

Since grounded pins 132-7 and 134-9 are both at lower positive voltages with respect to ground than their associated negative input pins, viz., pins 132-6 and 134-8, pins 132-1 and 134-14 are immediately grounded.

Summarizing, the "switching" of comparator-connected integrated circuit operational amplifier 136 results virtually immediately in the grounding of pins 132-1 and 134-14.

Since pin 134-14 is directly connected to the input terminal of the feedback loop, i.e., pin 160-3, the input terminal of the feedback loop is grounded when comparator-connected integrated circuit operational amplifier 136 "switches".

Since pin 132-1 is directly connected to the positive terminal (ungrounded) of memory capacitor 186, memory capacitor 186 is virtually immediately discharged when comparator-connected integrated circuit operational amplifier 136 "switches", i.e., pin 136-13 becomes grounded.

Thus, it will be seen that when comparator-connected integrated circuit operational amplifier 136 "switches", due to the charging of capacitor 198, the feedback loop of circuit 100 is inactivated, in the sense that its input terminal (pin 160-3) is grounded, and memory capacitor 186 is discharged.

Transistor 204, however, continues to conduct until a substantial amount of the charge on capacitor 198 is dissipated through resistors 200 and 202. Thus, relay 208 is energized, and continues in its actuated state, until said substantial amount of the charge on capacitor 198 is dissipated, at which time relay 208 returns to the unactuated state.

When relay 208 returns to its unactuated state (at time $T_r$ in FIG. 2), a signal is provided to controller 18 (FIG. 1) over electrical leads 52, 54, and the controller 18 energizes motor 16 in its reverse or gate raising direction, whereupon gate 12 retreats from said vehicle toward its fully open position. (This change in the energization of motor 16, so as to raise gate 12, is effected to internal circuitry of the controller, and not by electronic safety device 50 (circuit 100), which has only the capability of opening and closing its relay contacts connected to lines 52 and 54 in FIG. 1. Such controller arrangements are routinely provided by those having ordinary skill in the art without the exercise of invention.)

It should further be noted that during the dissipation of the charge on capacitor 198 the value of the voltage on pin 136-10 declines to the value of the voltage on pin 136-11, and drops therebelow. For this reason, pin 136-13 is "switched" from its grounded state to its open state, and pin 130-5 is no longer grounded.

Meanwhile, however, the actuation of relay 208 has caused the motor current to motor 16 to be interrupted, and thus terminated the appearance of the abovesaid rectified voltage across resistor 122.

Thus, the voltages of pins 130-4 and 130-5 return to the values which existed at time $T_o$, i.e., with the positive voltage above ground on pin 130-4 greater than the positive voltage above ground on pin 130-5. This being so, pin 130-2 remains grounded, and thus pins 132-1 and 134-14 remain grounded, and thus the feedback loop of circuit 100 remains inactivated.

Thus, it will be evident to those having ordinary skill in the art, informed by the present disclosure, that the switching network on circuit 100, comprising integrated circuit operational amplifiers 130, 132, 134, and 136, serves to "lock" the feedback loop network into its inactivated state until time $T_r$ (FIG. 2), at which time the feedback loop network is released from its inactivated state, after a suitable time delay to suppress undesired operation which would otherwise result from the starting surge of the motor current in lines 20 and 22 (FIG. 1).

As will now be evident to those having ordinary skill in the art, the present invention provides highly sensitive means for detecting abrupt changes in electrical current drawn by electrical devices, which means is not responsive to non-abrupt changes in said current.

As will also be apparent to those having ordinary skill in the art, informed by the present disclosure, the ability of devices embodying the present invention to sensitively detect abrupt changes in electrical device energizing current, while at the same time being non-responsive to non-abrupt changes in the same current, is provided by the feedback loop system thereof.

In the preferred embodiment shown in FIG. 3, for example, the feedback loop system thereof comprises operational amplifier 160, isolation amplifier 162, and the feedback network consisting of resistors 170 and 174 and capacitor 172.

Due to the operation of this feedback loop system of the embodiment of FIG. 3, the voltage at pin 160-1 quite closely follows slow or non-abrupt changes of the voltage at pin 160-3, but the voltage at pin 160-1 overshoots abrupt changes of voltage at pin 160-3.

That is to say, during a slow change of the voltage on pin 160-3 the voltage on pin 160-1 remains substantially the same as the voltage on pin 160-3. On the other hand, when the signal voltage on pin 160-3 abruptly increases by a particular voltage increment, the voltage at pin 160-1 abruptly increases by a voltage increment which is several times as great as said particular voltage increment.

As will also be understood by those having ordinary skill in the art, informed by the present disclosure, if such an abrupt change of voltage at pin 160-3 does not bring about the energization of relay 208, and the consequent termination of the signal on line 164, and if the voltage at pin 160-3 remains substantially constant for some time after said abrupt change therein, the voltage at pin 160-1 will go to the same value as the new voltage on pin 160-3.

As will further be seen by those having ordinary skill in the art, informed by the present disclosure, it is the overshoot voltage, i.e., the momentary maximum voltage different between pins 160-1 and 160-3, as applied to pin 190-9 via resistive network 176, 178, 180, which causes comparator-coupled amplifier 190 to "switch", and thus brings about the energization of relay 208, etc. The "switching" of comparator-connected amplifier 190 will, of course, only take place when the overshoot voltage is of sufficient amplitude.

Since, as pointed out hereinabove, the magnitude of the overshoot voltage is a function of the abruptness of the corresponding voltage changes occurring at pin 160-3, and the voltage appearing at pin 160-3 is a function of the current in primary winding 62, it follows that the circuit of the embodiment of FIG. 3 serves as a detector circuit for detecting abrupt changes, and only abrupt changes, in the current drawn by motor 16.

It will thus be seen that the objects set forth above, among those made apparent from the preceding description, are efficiently attained, and since certain changes may be made in the above construction without departing from the scope of the present invention it is intended that all matter contained in the above description of shown in the accompanying drawings shall be interpreted as illustrative only, and not in a limiting sense.

Thus, it will be understood that while the embodiment of the electronic safety device of the present invention shown in FIG. 3 is of particular application in connection with motor-driven gates, and the like, the electronic safety device of the present invention has general application wherever an unsafe condition, or any other condition desired to be detected, is accompanied by an abrupt change in the current drawn by an electrical device.

It is also to be understood that the following claims are intended to cover all of the generic and specific features of the invention herein described, and all statements of the scope of the invention, which, as a matter of language, might be said to fall therebetween.

What is claimed is:

1. A detector circuit for detecting abrupt changes in current drawn by an electrical device, comprising:
   an operational amplifier having an output terminal and plural input terminals;
   an isolation amplifier;
   feedback means connecting an output terminal of said isolation amplifier with one of said input terminals; and
   input means for supplying to one of said input terminals a signal representing said current.

2. A detector circuit as claimed in claim 1, further comprising a capacitance connected to an input terminal of said isolation amplifier for storing an amount of electrical charge representative of said current.

3. A detector circuit for detecting abrupt changes in current drawn by an electrical device, comprising:
   an operational amplifier having an output terminal and plural input terminals;
   an isolation amplifier;
   feedback means connecting an output terminal of said isolation amplifier with one of said input terminals;
   input means for supplying to one of said input terminals a signal respresenting said current;
   a capacitance connected to an input terminal of said isolation amplifier for storing an amount of electrical charge representative of said current; and
   a comparator-connected amplifier having an output terminal and first and second input terminals, first coupling means for coupling an input terminal of said isolation amplifier to said first input terminal of said comparator-connected amplifier, and second coupling means for coupling said output terminal of said operational amplifier to said second input terminal of said comparator-connected amplifier.

4. A detector circuit as claimed in claim 3, further comprising inactivating means for discharging said capacitance when a particular signal is produced at the output terminal of said comparator-connected amplifier.

5. A gate control circuit, comprising:
   electric motor means for driving a gate between its open and closed positions;
   a controller for supplying energizing current to said electric motor means;
   detecting means for detecting said energizing current and producing an output signal representing said energizing current;
   storage means for storing a quantity which varies in accordance with the instantaneous values of said signal;
   comparison means for comparing said signal with said quantity; and
   output signal producing means for producing an output signal when the relationship between said signal and said quantity changes abruptly.

6. A gate control circuit, comprising:
   electric motor means for driving a gate between its open and closed positions;
   a controller for supplying energizing current to said electric motor means;
   motor current signal generating means for generating a signal representing said energizing current; and
   detector circuit means comprising an operational amplifier having an output terminal and plural input terminals, an isolation amplifier, feedback means connecting an output terminal of said isolation amplifier with one of said input terminals, and connecting means for connecting said signal representing said energizing current to one of said input terminals.

7. A gate control circuit as claimed in claim 6, further comprising a capacitance connected to an input terminal of said isolation amplifier for storing an amount of electrical charge representative of said energizing current.

8. A gate control circuit as claimed in claim 7, further comprising a comparator-connected amplifier having an output terminal and first and second input terminals, first coupling means for coupling an output terminal of said isolation amplifier to said first input terminal of said comparator-connected amplifier, and second coupling means for coupling said output terminal of said operational amplifier to said second input terminal of said comparator-connected amplifier.

9. A gate control circuit as claimed in claim 8, further comprising inactivating means for discharging said capacitance when a particular signal is produced at the output terminal of said comparator-connected amplifier.

10. A gate control circuit, comprising:
- a motor for driving a gate between its open and closed positions;
- a controller for supplying energizing current to said motor;
- an operational amplifier having an output terminal and first and second input terminals of opposite polarity;
- a follower amplifier;
- a unidirectionally conducting device connected between said output terminal of said operational amplifier and an input terminal of said follower amplifier; and
- feedback means connecting the output terminal of said follower amplifier with one of said input terminals of said operational amplifier.

11. A gate control circuit as claimed in claim 10, further comprising a capacitance connected to said input terminal of said follower amplifier for storing an amount of electrical charge representative of the steady state value of said energizing current when said gate is being operated by said motor.

12. A gate control circuit as claimed in claim 11, further comprising a comparator-connected amplifier having an output terminal and first and second input terminals of opposite polarity, first coupling means for coupling said output terminal of said follower amplifier to said first input terminal of said comparator-connected amplifier, and second coupling means for coupling said output terminal of said operational amplifier to said second input terminal of said comparator-connected amplifier.

13. A gate control circuit as claimed in claim 12, further comprising inactivating means for discharging said capacitance and preventing signals from reaching the other one of said input terminals of said operational amplifier when a particular signal is produced at the output terminal of said comparator-connected amplifier.

14. An electronic safety device, comprising:
- first signal producing means for producing a first signal the magnitude of which is substantially proportional to the magnitude of a current drawn by electric motor means when driving a mechanical load;
- second signal producing means for producing a second signal the magnitude of which is substantially proportional to said magnitude of said current only so long as the rate of change of said current does not exceed a particular value; and
- comparing means for comparing said first and second signals and producing an output signal when said first and second signals differ by at least a predetermined amount.

15. An electronic safety device as claimed in claim 14, further comprising current interrupting means for interrupting said current drawn by electric motor means in response to said output signal.

* * * * *